UNITED STATES PATENT OFFICE.

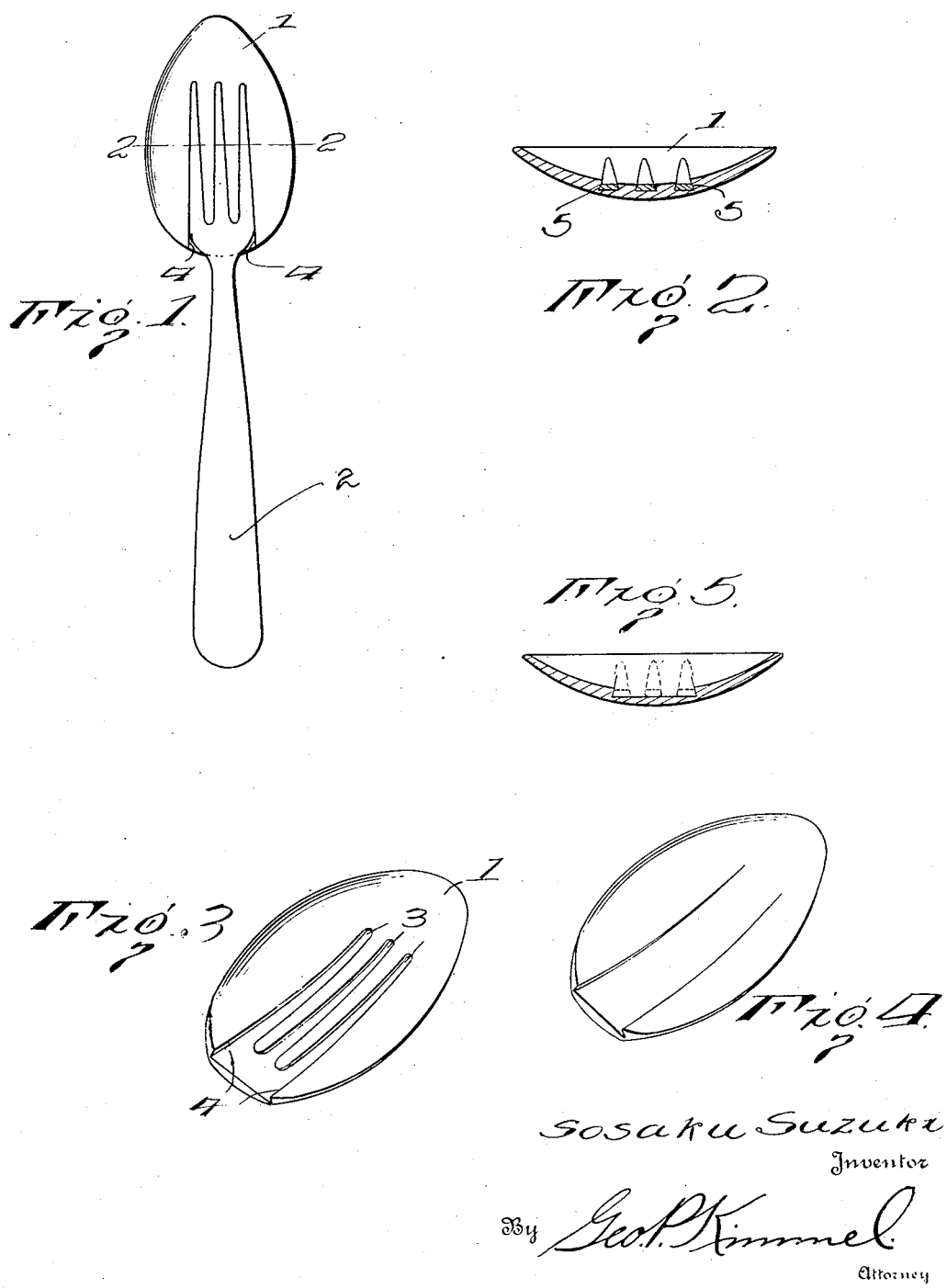

SOSAKU SUZUKI, OF TOKYO, JAPAN.

COMBINATION SPOON AND FORK.

1,348,762.   Specification of Letters Patent.   Patented Aug. 3, 1920.

Application filed March 12, 1919. Serial No. 282,159.

*To all whom it may concern:*

Be it known that I, SOSAKU SUZUKI, a subject of the Emperor of Japan, and resident of 28 Itchome, Hamacho, Nihombashi Ku, at the city of Tokyo, in the Prefecture of Tokyo and Empire of Japan, have invented a new and useful Combination Spoon and Fork, of which the following is a specification.

This invention relates to a combination spoon-and-fork in which three grooves or slots are bored at the plane surface provided in the hollow of a spoon without a handle in such a way that a fork may be attached thereto, and a track is provided at each of the two sides of the said plane so that the fork may be inserted in or removed from the plane by keeping close thereto, all these parts being so contrived and arranged that the handle of the fork may be used as a handle for the spoon and the spoon may be utilized as a sheath for the fork.

An object of this invention is to provide a combination spoon-and-fork capable of being used either as a spoon or a fork with good result by converting it into either of the two wares at a time according to requirements.

Another object of this invention is to provide a combination spoon-and-fork calculated to economize material or materials required for making both wares and reduce cost of manufacture accordingly by utilizing one handle for both.

A further object of this invention is to provide a combination spoon-and-fork lighter in weight and more convenient to carry about besides being safer to keep.

Other objects and advantages to be derived from the use of this invention will appear in the following detailed description and the claims taken with an inspection of the accompanying drawing, in which:

Figure 1 is a view showing the manner in which a fork is inserted in a spoon without a handle.

Fig. 2 is a view on the line 2—2 of Fig. 1.

Fig. 3 is a plan view showing the manner in which grooves or slots are bored on the plane surface provided in the hollow of the spoon without a handle.

Fig. 4 is a perspective view of a modified form of the invention, and

Fig. 5 is a transverse section of the spoon portion with the fork removed.

Similar numerals for reference designate like and corresponding parts throughout the several views.

As shown in the accompanying drawing, three grooves or slots 3 are bored at the plane surface provided in the hollow of a spoon 1 without a handle, and a track 4 is provided at either side of a groove or slot 3 in such a way that the tracks come into close contact with the slantly grooved parts 5 at both sides of a fork 2 for the purpose of inserting the fork in the said grooved parts of the spoon 1 through the lower margin thereof with its forked part disposed on the plane surface of the spoon 1, all these parts being so arranged and constructed that the fork can be easily inserted in or drawn out and the handle of the fork may be made to serve as a handle for the spoon in addition to its proper function.

By inserting the fork 2 in the spoon 1 along the three grooves or slots through the lower margin of the spoon, the forked part of the fork is disposed on the plane surface of the spoon and both wares are firmly combined in a predetermined position, and in this case the combination can be effectively used as a spoon, the handle of the fork serving as a handle for the spoon. And by drawing the fork 2 out of the spoon 1, the fork can be instantly brought to serve as an ordinary fork.

In a modified form of this invention, a single groove or slot, just wide enough to allow a fork to be inserted therein and held in place, is bored longitudinally at the middle part of the hollow of a spoon without a handle, and a track is provided at either side of the groove to bring the fork into close contact with the face of the groove, this modification being intended to simplify the construction. The groove is intended to serve as a guide or way for the fork besides being a socket for the handle. In this case, also, the spoon and the fork can be combined into one or separated into two wares as required.

Having thus fully described my invention, what I claim as new and desire to secure by Letters Patent is:

1. A device of the type described comprising a concave body formed to serve as a spoon, one of the faces of the body being grooved and provided with an open recessed portion communicating with the grooves, the sides of the grooves and recess being formed with a bevel constituting a track for receiving the tines and body of a fork the handle of which constitutes a handle for the spoon shaped body.

2. A device of the type described comprising a concave body formed to serve as a spoon, the concave face of the body being provided with a plurality of similarly disposed longitudinal grooves and further provided with an open recessed portion communicating with the grooves, the sides of the grooves and recess being formed with a bevel constituting a track for receiving the tines and body of a fork the handle of which constitutes a handle for the spoon shaped body.

In testimony whereof I affix my signature hereto.

SOSAKU SUZUKI. [L. S.]